Aug. 22, 1944.   A. BARGEBOER   2,356,498
METHOD OF PRESERVING FOODSTUFFS
Filed Sept. 24, 1940   3 Sheets-Sheet 1
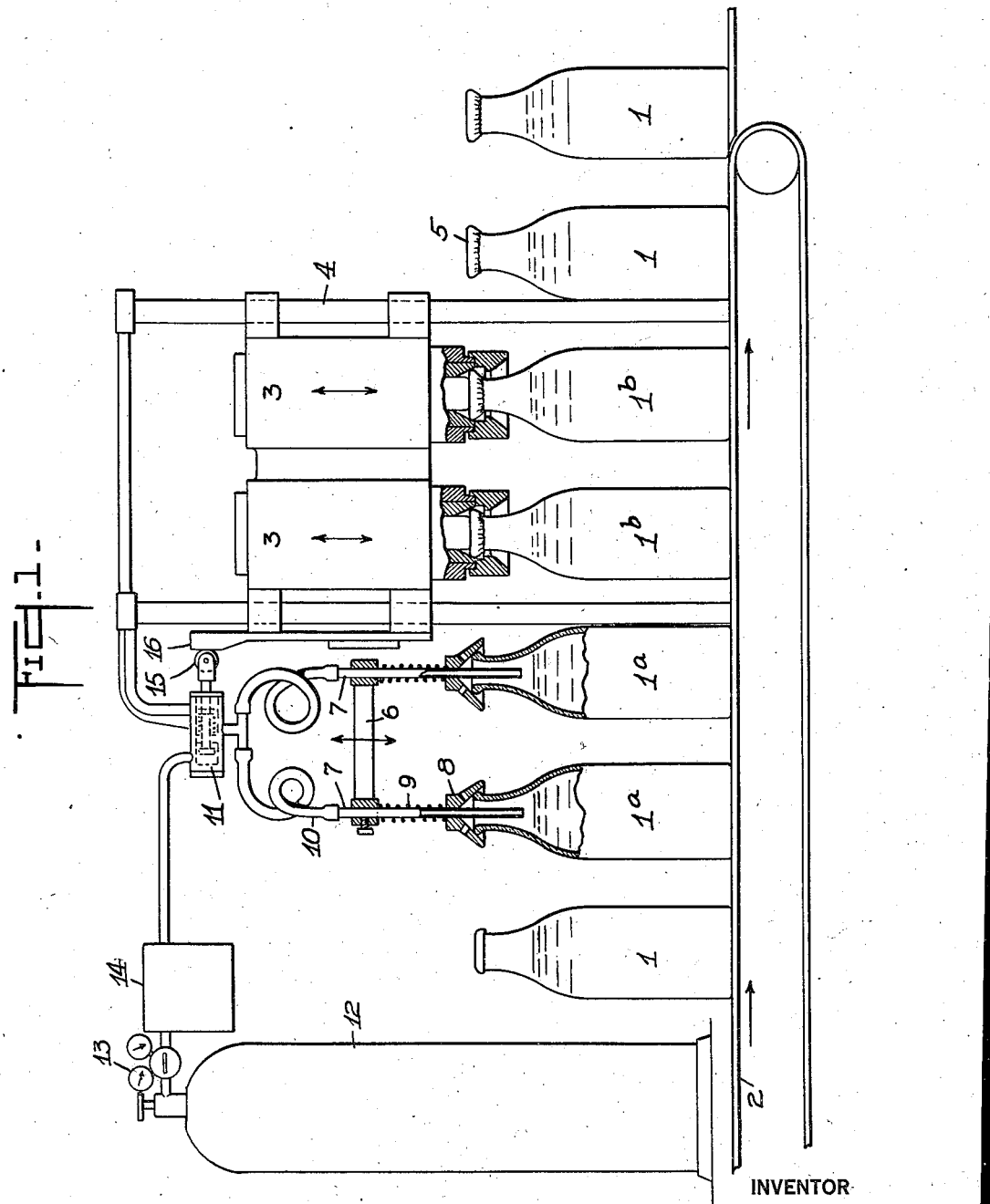
INVENTOR
Adolf Bargeboer
BY
ATTORNEY.

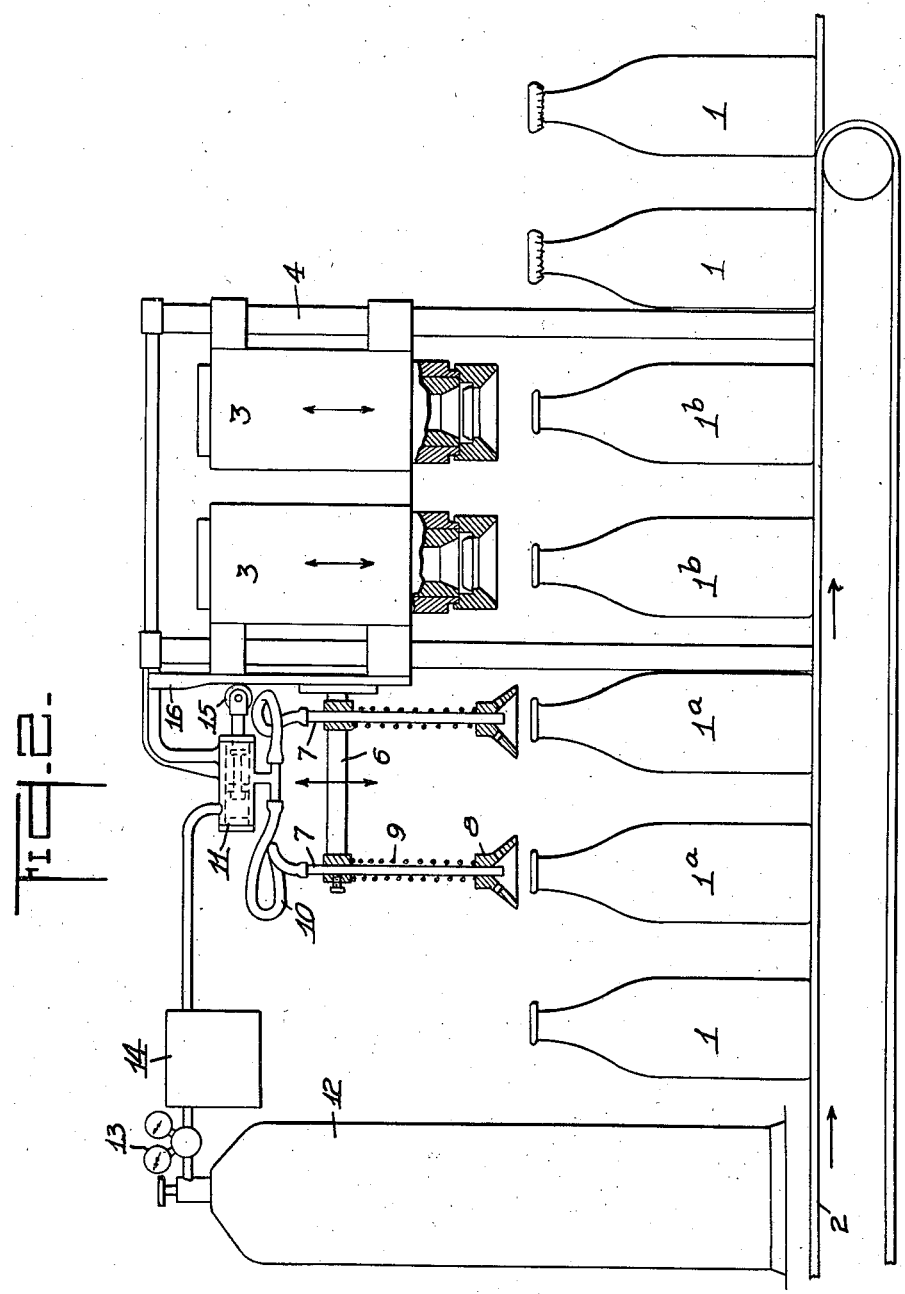

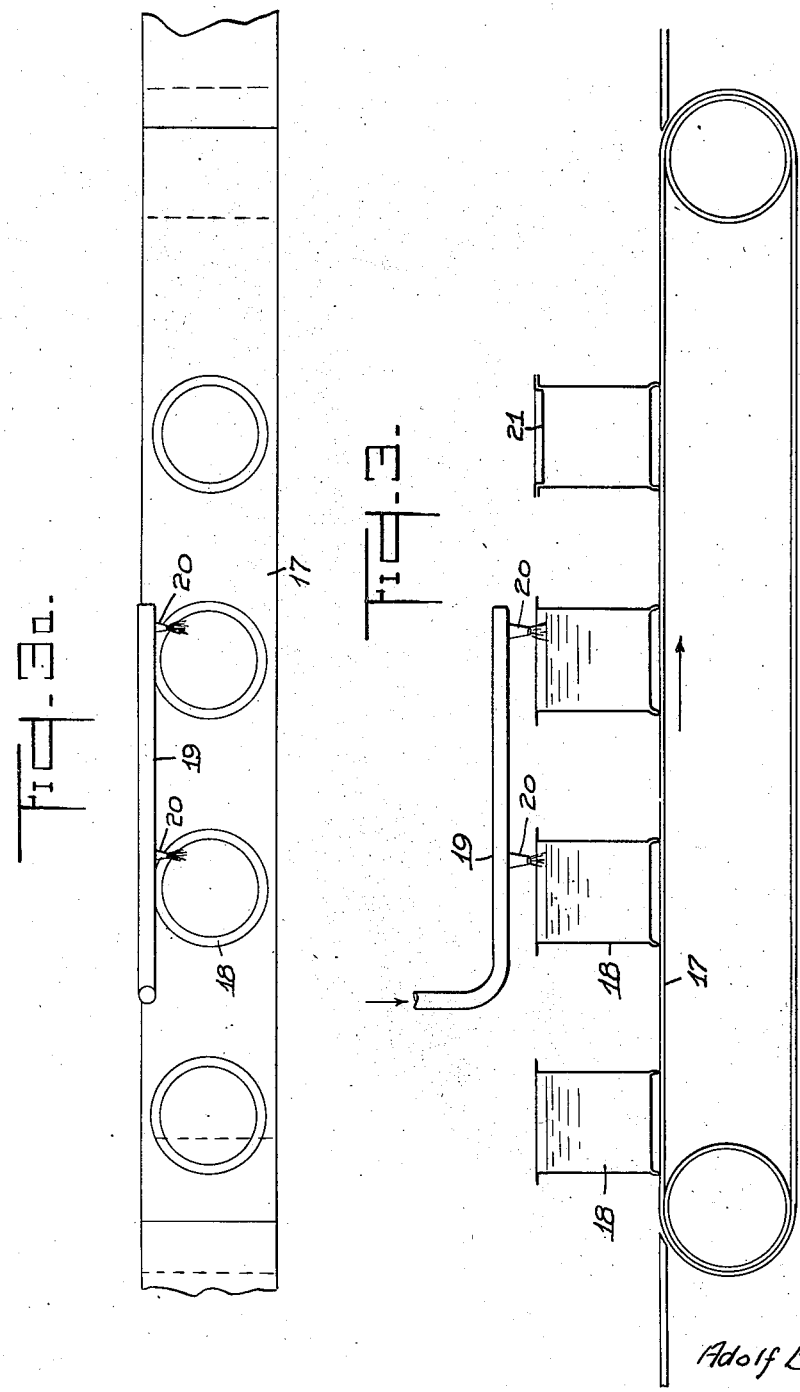

Patented Aug. 22, 1944

2,356,498

UNITED STATES PATENT OFFICE 2,356,498

METHOD OF PRESERVING FOODSTUFFS

Adolf Bargeboer, The Hague, Netherlands; vested in the Alien Property Custodian

Application September 24, 1940, Serial No. 358,093
In the Netherlands December 23, 1939

1 Claim. (Cl. 99—150)

When preserving foodstuffs in bottles, tins, or the like, especially milk products with a high percentage of moisture, it appears to be greatly important that the air at the top of the liquid is removed before closing the container.

This holds as well for products which are preserved before filling as after filling, e. g. by heat-treatment in the container.

At this last category it was mostly done in this way that the whole tin or bottle was heated till almost 100° C. before closing, in order to expulse the air by the generated water-vapour. It might also be done in filling the bottle before closing with liquid of high temperature or by evacuating the bottle before closing.

All these methods give rise to difficulties and mostly a decrease of quality.

The invention now eliminates these difficulties as follows: before closing the container the air in the space in top of the contents is expulsed partly or completely by means of a gas which is soluble in the liquid contents such as carbonic acid gas, ammonia, etc.

After closing, the gas in top of the container dissolves in the water of the food-stuff and, as a result, a high vacuum is generated in the container.

It is experienced that the high vacuum atmosphere of non-oxygenous gas has remarkable good preserving qualities, especially if carbon-dioxide is used as expulsing gas.

In using carbon-dioxide, as a consequence of the high density of this gas the air is easily expulsed.

Moreover this carbonic acid gas especially in highly-sterilized liquid milk products, has a very favourable influence on the flavour and colour, and when heating undesirable boiling with froth formation is avoided.

According to the invention this process can be applied in a simple way, by blowing carbon-dioxide in the space on top of the contents, after filling.

As this gas is a very dense one, the empty bottle may also be filled with carbonic acid gas and afterwards filled with the product.

According to the invention a simple device may be applied by having the filled tins, bottles or the like, passed under tubes or the like which as an example blow carbonic-acid gas on top of the contents.

Furthermore it is possible according to the invention, especially in case of treatment of milk products to be preserved, to employ the device in such a way that the tubes or the like descend partly into the neck of the bottle.

As a consequence of the relatively low density of the air this is expulsed by a very small quantity of carbonic-acid gas and the flow can be so slow that the liquid surface remains quiet and thus during this filling practically no carbonic-acid penetrates into the liquid. When the bottle is closed and is agitated, the gas mixes with the liquid and dissolves completely, thus causing a high vacuum in top of the liquid.

Besides carbonic-acid, also ammonia-gas, chlorine or the like may be applied, or a mixture of these with carbonic-acid.

For closing the bottles it is usual to make use of machines which seal the bottle with a capsule or a crowncork using a periodically rising and descending device.

According to the invention one or more supply-tubes for the gas may be fixed to the device illustrated in a simple way and when the device makes the descending movement the tubes descend in the bottles which are already placed in the proper position under this machine and in this moment blow the gas into the necks. At the next movement these bottles are shifted and closed, etc.

By means of this device a dosing-device for the gas may be employed in order to supply the gas in the exact quantity and at the right moment.

Figs. 1 and 2 show schematically a device according to the invention. Bottles 1 are periodically shifted two places by means of conveyor-belt 2. After standstill, the capulse-head 3, 3 descends along conducting-device 4 and supplies in the known way the bottles with a crowncork 5. The arm 6 is fixed to the head 3, 3, which arm bears the small tubes 7.

On these small tubes the centering cone 8 is slidingly arranged, suspended to the spring 9 whereas the tubes are connected with rubber hoses to the valve box 11, which is fixed to the frame of the machine.

Further the cam 16 is fixed to the capsule-head 3—3, which runs along the roll 15 of the valve-stem of the valve-box 11. The valve-box is connected via small tank 14 to reducing valve 13 with the gas cylinder 12. The system operates as follows:

During the period that the bottles are shifted (Fig. 2), 3, 3 is in the upward position and valve-box 11 is closed. The gas from cylinder 12 flows into reservoir 14 and the pressure rises during this period to a predetermined value. After stopping of the conveyor belt (Fig. 1), capsule-head 3, 3 descends, whereat the tubes 9 descend into the neck of the bottles, centered by the cones 8, whereas in the almost lowest position the cam 16 presses open the valve and the gas flows into the necks of the bottles. At the same time, the bottles 1ᵇ, which had been supplied with gas at the former movement, are now supplied with a crowncork 5, etc.

By application of the dosing-device 13, 14, 11, the gas consumption is limited to the minium and the air expulsion takes place without the gas penetrating into the liquid.

In the same way the tins closing machine can be constructed, namely, the air on top of the liquid in the tins is expelled, just before covering the tin with the lid, by a small flow of gas, preferably carbonic acid.

In Fig. 3 a device for the purpose is schematically demonstrated. The filled tins 18 are moved by a conveyor belt 17. Above the tins is fixed a pipe 19 with nozzles 20. The expulsing gas is blown in the tins, so eliminating the air in top of the contents. The lid 21 is now applied and the tin is closed.

For this purpose a dense gas, such as carbon dioxide is preferred for preventing the mixing with air after expulsion. The nozzles 20 may be arranged preferably tangentially to the liquid surface, as shown in Fig. 3.

I claim:

A method of vacuum packing foodstuffs consisting largely of water comprising the steps of filling the water containing foodstuff into a container to a level short of the capacity of the container, to form an air zone in the upper portion of the container, slowly feeding substantially tangentially to the surface of said foodstuff a small amount of water soluble gas directly into said zone to displace the air therefrom, without disturbing the surface of the foodstuff contents, sealing the container tightly, and thereafter causing dissolution of the gas in the water contained in the foodstuff contents to produce a vacuum in the container on top of the foodstuff contents.

ADOLF BARGEBOER.